(12) United States Patent
Chandrasekaran et al.

(10) Patent No.: US 8,856,350 B2
(45) Date of Patent: Oct. 7, 2014

(54) EFFICIENT CONNECTION MANAGEMENT AND DATA SYNCHRONIZATION

(75) Inventors: Subramanian Chandrasekaran, Redmond, WA (US); Anthony Bryan Bell, Carnation, WA (US); Malarvizhi Chinnusamy, Redmond, WA (US); Xianjie Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 12/876,268

(22) Filed: Sep. 7, 2010

(65) Prior Publication Data

US 2012/0059939 A1    Mar. 8, 2012

(51) Int. Cl.
*G06F 15/16* (2006.01)
*H04L 29/08* (2006.01)
*H04L 29/06* (2006.01)

(52) U.S. Cl.
CPC ......... *H04L 67/1095* (2013.01); *H04L 65/1046* (2013.01)
USPC .......................................... 709/227; 709/249

(58) Field of Classification Search
CPC .................................................. H04l 65/1046
USPC ................................................ 709/227, 249
See application file for complete search history.

(56) References Cited

U.S. PATENT DOCUMENTS

| | | | |
|---|---|---|---|
| 6,263,016 B1 | 7/2001 | Bellenger et al. | |
| 6,483,853 B1 | 11/2002 | Kshirsagar et al. | |
| 7,035,213 B2 | 4/2006 | Moran et al. | |
| 7,218,630 B1 | 5/2007 | Rahman | |
| 7,467,220 B2 | 12/2008 | del Val et al. | |
| 2007/0019544 A1* | 1/2007 | Ashwood Smith et al. | .. 370/230 |
| 2007/0078986 A1 | 4/2007 | Ethier et al. | |
| 2007/0116004 A1* | 5/2007 | Kang et al. | .................. 370/395.2 |
| 2008/0062877 A1 | 3/2008 | Chen | |
| 2008/0181207 A1 | 7/2008 | Tu | |
| 2008/0181382 A1* | 7/2008 | Lean et al. | ............... 379/201.12 |
| 2009/0003324 A1* | 1/2009 | Zhao et al. | .................... 370/353 |
| 2009/0067439 A1 | 3/2009 | Yamamoto et al. | |
| 2010/0054177 A1 | 3/2010 | Sahin et al. | |

OTHER PUBLICATIONS

Nielsen, et al., "Network Performance Effects of HTTP/1.1, CSS1, and PNG", Retrieved at <<http://conferences. sigcomm.org/sigcomm/1997/papers/p102.pdf>> In the proceedings of the ACM SIGCOMM '97 conference on Applications, technologies, architectures, and protocols for computer communication Published Date: 1997, p. 155-166.

* cited by examiner

*Primary Examiner* — Liangche A Wang
*Assistant Examiner* — Cheikh Ndiaye
(74) *Attorney, Agent, or Firm* — Andrew Smith; Jim Ross; Micky Minhas

(57) ABSTRACT

Call admission control ("CAC") servers in a pool are fully connected to one another. Session data received at one of the CAC servers in a pool is synchronized to each of the other CAC servers in the pool by way of the connections. Each CAC server in a first pool may also establish a connection with exactly one CAC server in a second pool. Status updates and commit data is synchronized from a CAC server in the first pool to a CAC server in the second pool. The commit data may then be synchronized to each of the CAC servers in the second pool.

12 Claims, 10 Drawing Sheets

| STATUS UPDATE | | |
|---|---|---|
| LINK | MEDIA TYPE (702B) | CURRENT UTILIZATION |
| 1 | AUDIO | 4/6 MBPS |
| 1 | VIDEO | 2/3 MBPS |
| ... | ... | ... |

*Fig. 7*

EFFICIENT CONNECTION MANAGEMENT AND DATA SYNCHRONIZATION

BACKGROUND

Large organizations may operate many different physical locations around a city, state, country, or even around the world. In order to provide real-time data and voice connectivity between locations, a number of wide area network ("WAN") links may be established. The WAN links can be utilized to support data communications between the locations, including audio and/or audio/video sessions made between client devices placed at the locations. For instance, voice over Internet protocol ("VoIP") calls may be made between clients placed at various locations connected by one or more WAN links. Similarly, video calls might also be made between clients placed at locations connected by WAN links.

In some real-time communications installations, a call admission control ("CAC") server provides functionality for managing bandwidth utilization. For instance, a CAC server might participate during the setup of a new call to ensure that enough bandwidth is available on the appropriate network links to support the call. If sufficient bandwidth is not available, the CAC server might not allow the call to be completed, or might cause the call to be routed over another network such as the public switched telephone network ("PSTN") or the Internet.

In order to provide redundancy and high availability in the provision of CAC services such as those described above, it is often necessary for CAC servers to establish connections with one another and to share data. In previous solutions, however, large numbers of network connections are typically required between CAC servers at different geographic locations. Additionally, previous solutions might require the synchronization of large amounts of data between CAC servers. As a result, previous solutions may require significant network overhead to support the connections and synchronization of data for the CAC feature, which can be very expensive especially when the network locations are dispersed over a large geographic area.

It is with respect to these and other considerations that the disclosure made herein is presented.

SUMMARY

Technologies are described herein for efficient connection management and synchronization in the provision of CAC services. Through the utilization of the technologies and concepts presented herein, CAC servers that provide CAC services can be inter-connected utilizing fewer network connections than possible in previous solutions. Additionally, the CAC servers can synchronize data in a more efficient fashion than previously possible, thereby utilizing less bandwidth.

According to one aspect presented herein, CAC servers are organized into groups referred to herein as pools. For instance, in one installation a pool of CAC servers might be located in the western United States and configured to provide CAC services for clients located in that area. Another pool of CAC servers might be located in the eastern United States and configured to provide CAC services to clients located in that area and in the mid-western United States. Other geographic configurations might also be utilized.

According to another aspect, each of the CAC servers in a pool of CAC servers establishes a network connection to each of the other CAC servers in the same pool. For instance, in one embodiment each of the CAC servers in a pool establishes and maintains a transmission control protocol ("TCP") connection to every other CAC server in the same pool. These network connections might be utilized to synchronize data among CAC servers in the same pool (referred to herein as "intra-pool" data synchronization). As an example, one of the CAC servers in a pool may receive session data from a client. Session data is data relating to a particular session, such as data indicating the amount of bandwidth utilized for a session. When such data is received at a CAC server, the CAC server synchronizes the data with each of the other CAC servers in the same pool by way of the network connections established with the other CAC servers.

According to another aspect, each of the CAC servers in a pool are further configured to establish exactly one network connection to a CAC server in another pool of CAC servers. For instance, each of the CAC servers in a first pool might establish exactly one network connection to a CAC server in a second pool. The CAC servers in the second pool also establish exactly one network connection to CAC servers in the first pool. The CAC server to which each connection is established might be selected randomly, using a round-robin approach, or by way of another mechanism. These network connections might be utilized to synchronize data between CAC servers in different pools (referred to herein as "inter-pool" data synchronization).

When data is received at a CAC server that is to be synchronized to another pool, the CAC server transmits the data to a CAC server in the other pool by way of a network connection to a CAC server in the other pool. For instance, status updates might be periodically synchronized by way of an incoming network connection from a CAC server in a different pool. A status update is data identifying the status of one or more network links and may include information such as data identifying a network link, a media type (such as voice or audio), and a current utilization of the network link. Commit data indicating that a portion of the bandwidth of a network link has been committed to a session might also be synchronized between pools and between CAC servers in the same pool in a similar fashion.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a data structure diagram showing aspects of a data structure for storing status update data utilized in one embodiment disclosed herein;

DETAILED DESCRIPTION

Figure 1:
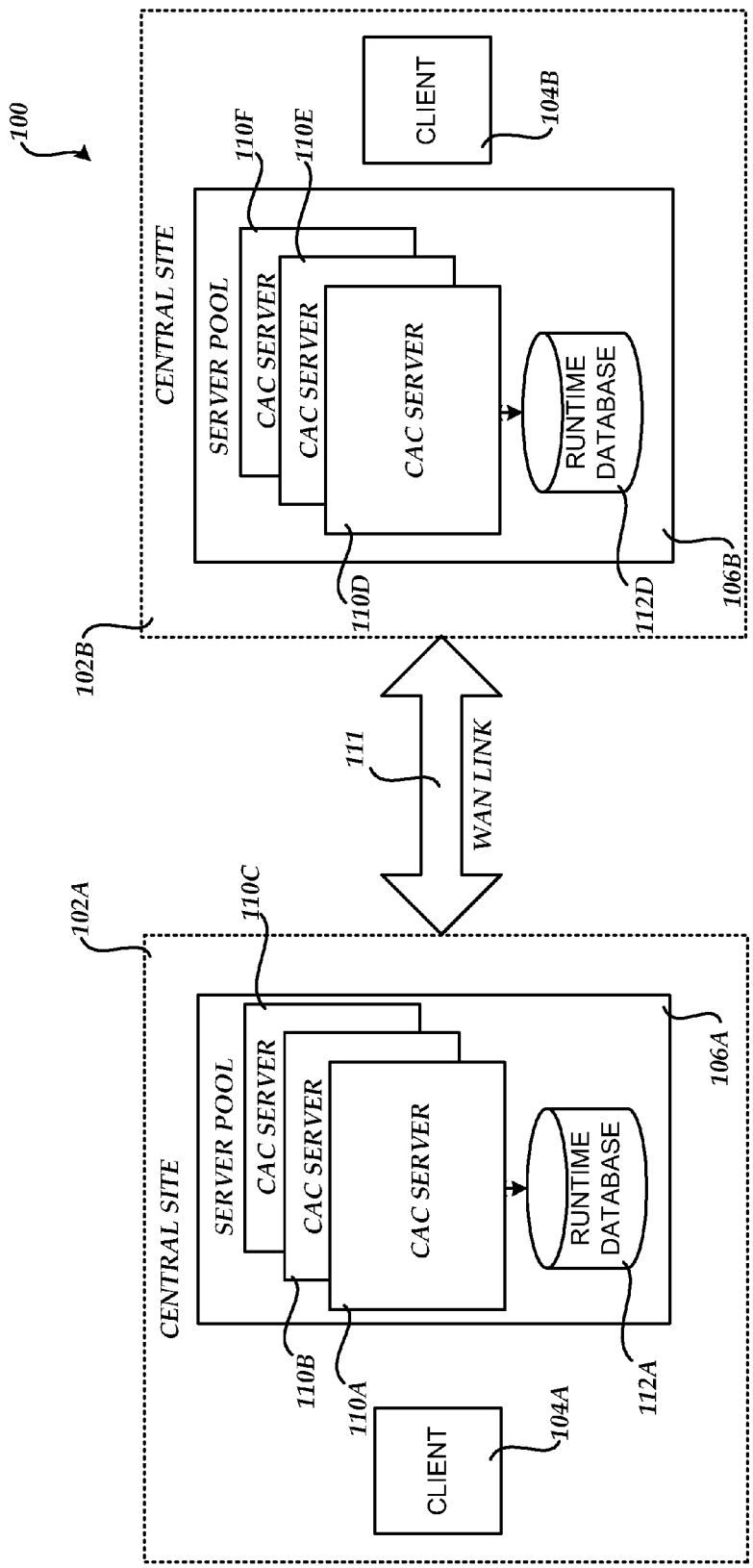
FIG. 1 is a network diagram showing an illustrative operating environment along with several components provided according to embodiments presented herein.
Figure 2:
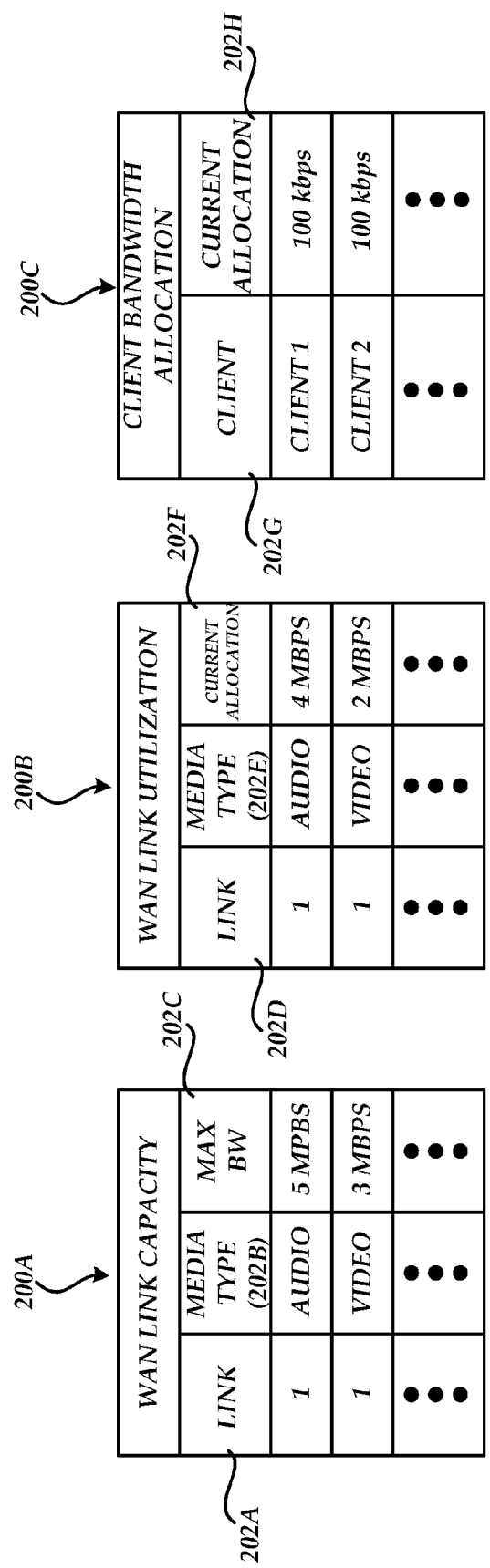
FIGS. 2A-2C are data structure diagrams showing aspects of data structures for storing WAN link capacity data, WAN link utilization data, and client bandwidth allocation data according to one embodiment disclosed herein.

The following detailed description is directed to technologies for efficient connection management and synchronization in the provision of CAC services. As discussed briefly above, CAC servers in a pool are fully connected to one another by way of network connections. Session data received at one of the CAC servers in a pool is synchronized to each of the other CAC servers in the pool by way of the connections. Each CAC server in a first pool may also establish a connection with exactly one CAC server in a second pool. Status updates and commit data are synchronized from a CAC server in the first pool to a CAC server in the second pool. Status updates may be synchronized on incoming network connections from the second pool. The commit data may also be synchronized to each of the CAC servers in the second pool. In this manner, fewer inter-pool network connections are required and less data is utilized to synchronize data between pools that in previous solutions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of various technologies for efficient connection management and synchronization in the provision of CAC services will be described.

Turning now to FIG. 1, details will be provided regarding one embodiment presented herein for efficient connection management and synchronization in the provision of CAC services. In particular, FIG. 1 is a network diagram showing an illustrative operating environment along with several components provided according to embodiments presented herein. As shown in FIG. 1, the environment 100 includes a central site 102A configured for communication with a central site 102B by way of a WAN link 111. As discussed briefly above, the central sites 102A-102B may be located in different physical locations around a city, state, country, or even around the world.

In order to provide data and voice connectivity between the central sites 102A-102B, a WAN link 111 has been established between the two locations. The WAN link 111 can be utilized to support data communications between the central sites 102A-102B, including audio and/or audio/video sessions made between client devices situated at the central sites 102A-102B. For instance, VoIP calls may be made between clients located at the central sites 102A-102B. Similarly, video calls might also be made between clients placed at the central sites 102A-102B. It should be appreciate that the term "call" and "session" may be used interchangeably herein.

As shown in FIG. 1, the central sites 102A-102B include a number of clients 104A-104B (which may be referred to herein collectively as the clients 104). For instance, the central site 102B includes the client 104B and the central site 102A includes the client 104A. The clients 104A-104B are devices that are capable of establishing an audio or video communications session with another client via a network link. For instance, in various embodiments, the clients 104A-104B may be wired or wireless telephones configured for communication over a data communications connection, desktop, laptop, or other types of computers configured with an appropriate software client for audio and/or video communications over a data communications link, and other types of devices. It should be appreciated that while FIG. 1 illustrates two central sites 102A-102B and two clients 104A-104B, many more network sites and clients may be utilized. It should also be appreciated that the environment 100 has been shown in a simplified form and that many more network connections and computing systems may be utilized in order to implement the various concepts disclosed herein.

As also shown in FIG. 1, each of the central sites includes a server pool 106. For instance, the central site 102A has a server pool 106A and the central site 102B includes a server pool 106B. The server pools 106A-106B are installations of one or more server computers configured to provide services to the clients 104A-104B. For instance, according to various embodiments, the server pools 106A-106B may assist the clients 104A-104B during call setup and establishment, name resolution, media conversion, and in other ways. In order to provide this functionality, the servers operating within the server pools 106A-106B may be configured to expose a number of services to the clients 104A-104B.

In one implementation, the pools 102A-102B include one or more CAC servers 110A-110F (which may be referred to collectively as "the CAC servers 110"). As discussed above, a CAC server provides functionality for managing bandwidth utilization. For instance, a CAC server might participate during the setup of a new call between the clients 104A-104B to ensure that enough bandwidth is available on the WAN link 111 to support the call. If sufficient bandwidth is not available, the CAC server might not allow the call to be completed, or might cause the call to be routed over another network such as the PSTN or the Internet. For instance, the CAC servers might receive and respond to bandwidth policy requests and other queries received from the clients 104A-104B. A bandwidth policy request is a request for a specified amount of bandwidth for a new media session.

In one implementation, one of the clients 104A-104B generates a bandwidth policy request prior to the establishment of a media session. If a CAC server 110 determines that the requested amount of bandwidth can be granted, the CAC server 110 may permit the new call to be completed. Thereafter, the clients 104A and 104B will establish a media session and begin transmitting media over the WAN link 111. For instance, if the session established between the client 104A and the client 104B is a voice session, the clients 104A and 104B will transmit appropriate audio data across the WAN link 111. The session between the client 104A and the client 104B may then continue and be terminated in a conventional fashion. Additional details regarding the operation of the CAC servers 110 will be provided below with respect to the FIGS. 2A-9.

As illustrated in FIG. 1, each of the CAC servers might also maintain a runtime database, such as the runtime database 112A maintained by the CAC server 110A. The runtime databases 112 maintain, among other things, data regarding the current utilization of the network links for which a particular pool is responsible. For instance, the runtime database 112A is utilized to maintain data regarding one or more network links assigned to the CAC servers 110A-110C. Details regarding the type of data that might be stored in the runtime databases 112 will be provided below with regard to FIGS. 2A-2C.

In order to ensure that each of the CAC servers 110A-110F has access to data for making decisions regarding bandwidth allocation (such as data stored in a runtime database 112), the CAC servers 110A-110F are configured to synchronize data with one another. Intra-pool synchronization might be utilized to synchronize data between CAC servers 110 in the same pool, such as the CAC servers 110A-110C. Inter-pool synchronization might be utilized to synchronize data between CAC servers 110 in different pools, such as between the CAC server 110F in the pool 106B and the CAC server 110A in the pool 106A. Details regarding several embodiments disclosed herein for both intra-pool and inter-pool data synchronization will be provided below with regard to FIGS. 3-9.

It should be appreciated that although six CAC servers 110A-110F have been shown in FIG. 1, more or fewer CAC servers 110 might be utilized in a particular network installation. Additionally, although two pools 106A-106B have been shown in FIG. 1, more or fewer pools 106 might also be utilized. The number of CAC servers 110 and pools 106 might be selected based upon call volume, network topology, geographic considerations, and other factors.

FIGS. 2A-2C are data structure diagrams showing aspects of several data structures for storing WAN link capacity data, WAN link utilization data, and a client bandwidth allocation according to one embodiment disclosed herein. As discussed briefly above, the data structures 200A-200C may be stored in the runtime database 112 and utilized by the CAC servers 110. It should be appreciated that the data structures 200A-200C are merely illustrative and that other data structures or types might be utilized to store the data described herein. The data might be stored in a completely different fashion and additional data might also be stored.

FIG. 2A shows a data structure 200A configured for storing data indicating WAN link capacity. The CAC servers 110 might utilize information regarding the capacity and utilization of a WAN link to determine whether a request for bandwidth may be granted and to provide other functionality. In the illustrative embodiment shown in FIG. 2A, the data structure 200A includes a first field 202A that identifies the WAN link 111. The data structure 200A also includes a field 202B that identifies a particular media type, such as audio or video. The data structure 200A also includes a field 202C that identifies the maximum bandwidth for a particular link and media type. For instance, in the example shown in FIG. 2A, data has been provided for a WAN link 111 capable of supporting five mega-bits per second ("Mbps") of audio and three Mbps of video.

FIG. 2B shows a data structure 200B utilized to maintain data indicating a current utilization of a WAN link 111. The data stored in the data structure 200B might also be utilized by the CAC servers 110 to determine whether a request for bandwidth may be granted and to provide other functionality. The illustrative data structure 200B shown in FIG. 2B includes a field 202D for storing data identifying the particular WAN link 111, a field 202E for storing data identifying a particular media type, and a field 202F for storing data identifying a current allocation of bandwidth for the link and media type. For instance, in the example shown in FIG. 2B, the data structure 200B includes data indicating that the WAN link 111 currently has four Mbps of audio and two Mbps of video allocated thereto. Accordingly, in view of the example data structures 200A and 200B, the CAC servers 110 may conclude that the WAN link 111 has one Mbps available for audio and one Mbps available for video sessions.

FIG. 2C shows an illustrative data structure 200C that may be utilized to store data indicating the amount of bandwidth utilized by each client in an in-progress media session. In the illustrative example shown in FIG. 2C, the data structure 200C includes a field 202G for storing data identifying each client in an in-progress media session and a field 202H for storing data indicating the currently allocated bandwidth to each client. In the example shown in FIG. 2C, one hundred kilo-bits per second ("kbps") has been allocated to two clients. It should be appreciated that the data structure 200C has also been simplified and that other data might also be stored in the data structure 200C for use by the CAC servers 110.

Figure 3:
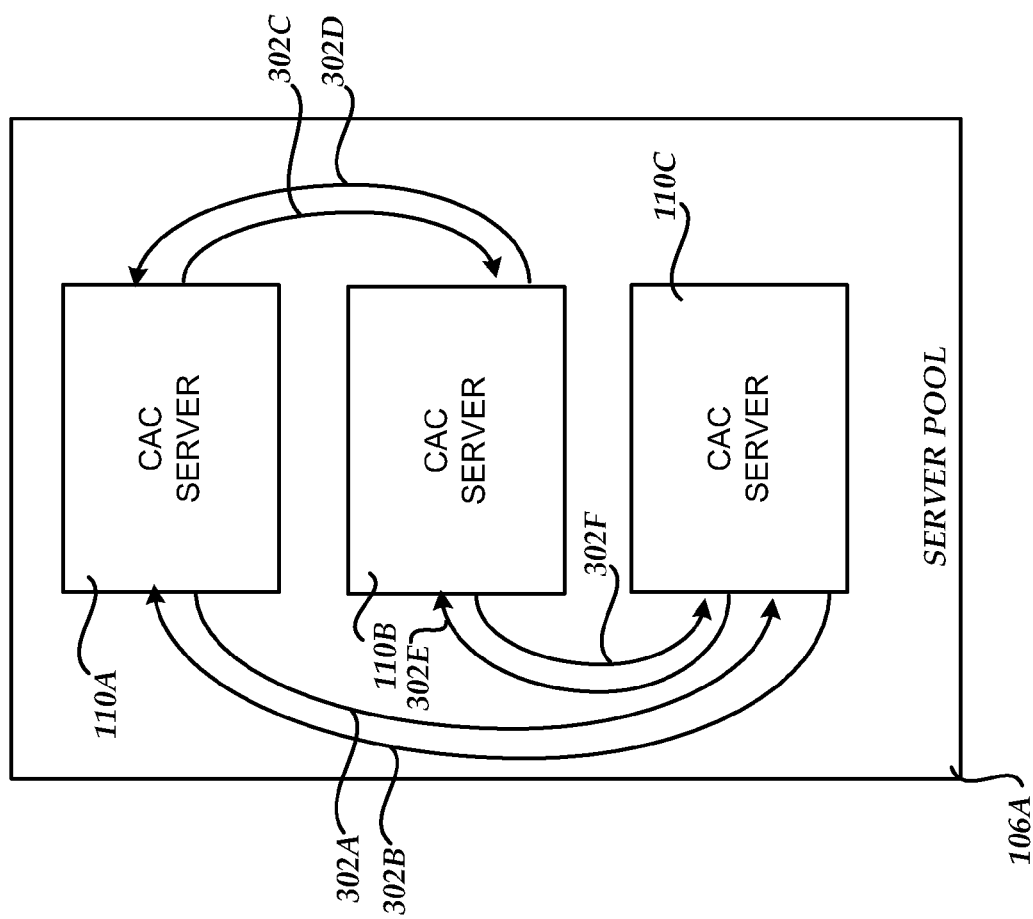
FIG. 3 is a network diagram showing illustrative network connections made between CAC servers in a pool of CAC servers according to one implementation.

FIG. 3 is a network diagram showing an illustrative network connections 302 made between CAC servers 110A-110C in a pool 106A of servers according to one implementation. As discussed briefly above, the CAC servers 110A-110C are organized into a group referred to herein as pool 106A. As also discussed briefly above, the CAC servers 110A-110C in a given server pool 106A might be assigned various network links for which they are responsible. The CAC servers 110A-110C are then responsible for management of the bandwidth on the assigned network links. For instance, the CAC servers 110A-110C might receive and respond to requests to allocate bandwidth to clients 104 on the assigned networks. Depending upon the number of requests to be processed by the CAC servers 110, more or fewer CAC servers 110 might be utilized in a particular network installation than shown in FIG. 3.

As also discussed briefly above, intra-pool synchronization may be performed in order to ensure that each of the CAC servers 110A-110C in a pool 106A has access to the same data utilized to make bandwidth policy discussions. In order to enable this functionality, each of the CAC servers 110A-110C in a server pool 106A may be fully connected to one another. In order to establish these connections, each of the CAC servers 110A-110C in a pool 106A establishes a network connection to each of the other CAC servers in the same pool. For instance, in the illustrative embodiment shown in FIG. 3, the CAC server 110A has established a network connection 302C with the CAC server 110B and a network connection 302A with the CAC server 110C. Similarly, the CAC server 110B has established a network connection 302D with the CAC server 110A and a network connection 302F with the CAC server 110C. The CAC server 110C has established a network connection 302B with the CAC server 110A and network connection 302E with the CAC server 110B. As will be discussed in greater detail below, the CAC servers 110A-110C utilize the network connections 302A-302F for intra-pool synchronization. Additional details regarding intra-pool synchronization will be provided below with respect to FIGS. 4-5.

Figure 4:
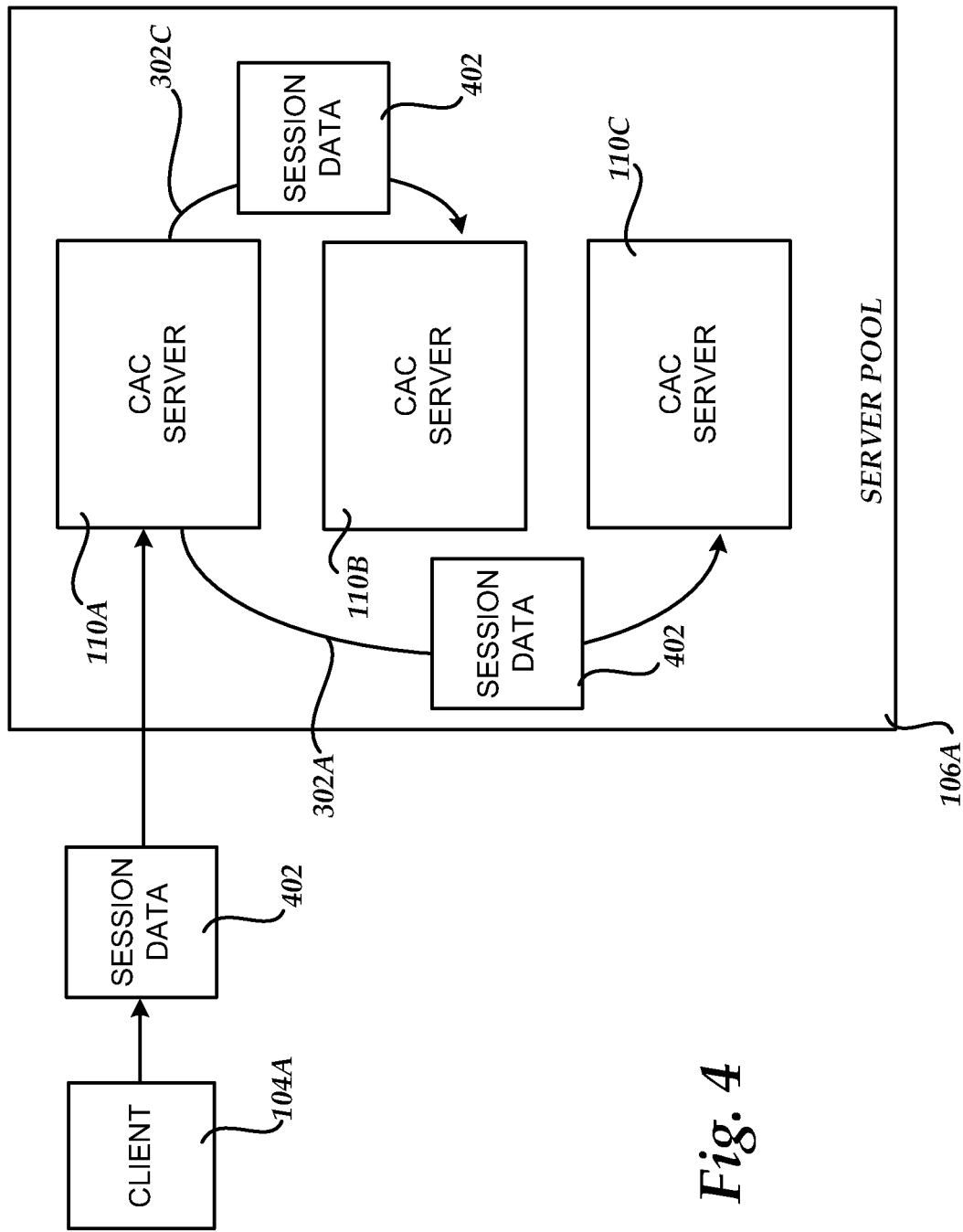
FIG. 4 is a network diagram showing aspects of one embodiment for synchronizing session data among CAC servers in a pool of CAC servers.

FIG. 4 is a network diagram showing aspects of one embodiment for synchronizing data among CAC servers 110A-110C in a pool 106A of CAC servers. In the example shown in FIG. 4, a client 104A has transmitted session data 402 to the CAC server 110A. As discussed briefly above, session data is data relating to a particular session such as data indicating the amount of bandwidth utilized for a session. As an example, the client 104A may transmit session data 402 to a CAC server 110A following establishment of a session that indicates the amount of bandwidth actually utilized for the session.

When the session data 402 is received at the CAC server 110A, the CAC server 110 synchronizes the session data 402 to the CAC servers 110B and 110C. In particular, the connection 302C is utilized to synchronize the session data 402 with the CAC server 110B and the connection 302A is utilized to synchronize the session data 402 to the CAC serve 110C.

When the session data 402 is received by the CAC servers 110B and 110C, these CAC servers might update their respective instances of the runtime database 112 to reflect the newly received session data 402. In this manner, each of the CAC servers 110A-110C continually maintains data that is consistent with the other CAC servers for making bandwidth policy decisions. It should be appreciated that, although not illustrated in FIG. 4, the CAC servers 110B and 110C also operate similarly to synchronize session data with to the CAC servers in the same server pool 106A.

Figure 5:
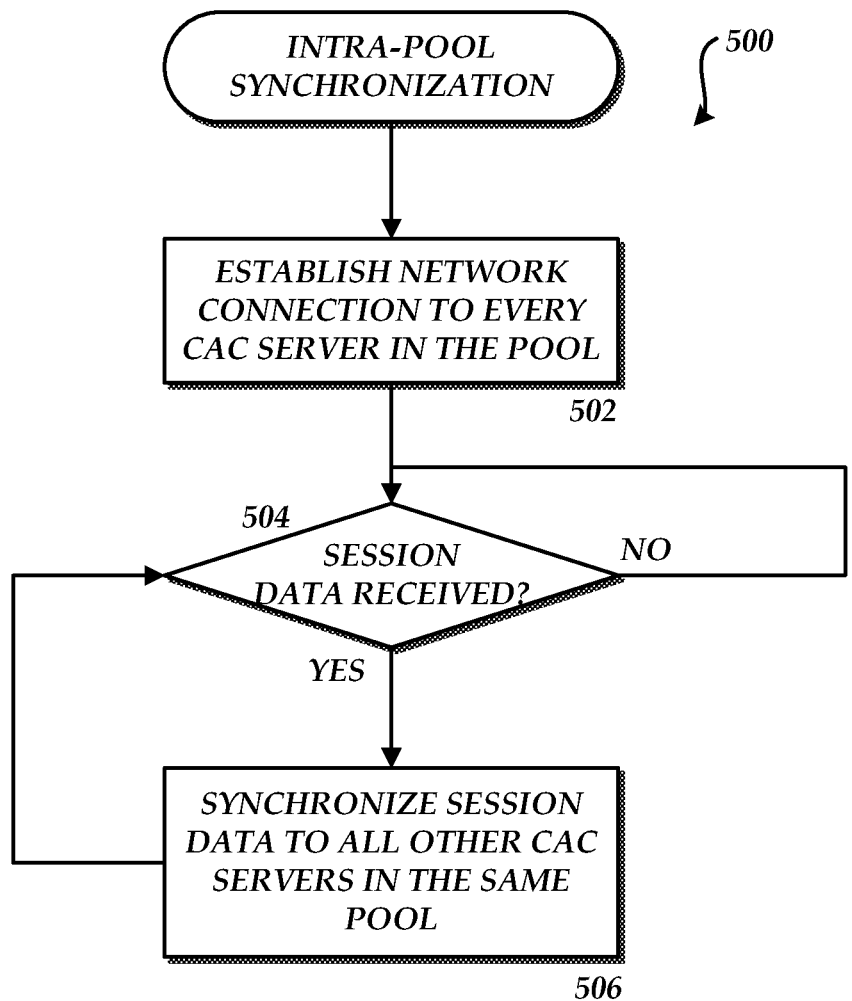
FIG. 5 is a flow diagram showing aspects of one process presented herein for synchronizing data between CAC servers in a pool of CAC servers.

Turning now to FIG. 5, additional details will be provided regarding the embodiments presented herein for efficient connection management and synchronization in the provision of CAC services. In particular, FIG. 5 shows a routine 500 that illustrates aspects of the operation of the CAC servers 110 for intra-pool synchronization according to one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where each of the CAC servers 110 establishes a network connection to every other CAC server in the same pool 106 in the manner described above with respect to FIG. 3. As discussed briefly above, these network connections may comprise TCP connections or other suitable network connections.

Once the network connections 302 have been established between CAC servers 110 in the same server pool 106, the routine 500 proceeds from operation 502 to operation 504. At operation 504 the CAC servers 110 determine whether session data 402 has been received. If session data has not been received, the routine 500 proceeds again to operation 504 where a similar determination is made. If, however, session data 402 has been received, the routine 500 proceeds from operation 504 to operation 506.

At operation 506, the CAC server 110 synchronizes the session data 402 to all of the other CAC servers 110 in the same pool 106. As discussed above, the network connections 302 from the CAC server 110 that receives the session data 402 to the other CAC servers in the same server pool 106 might be utilized to synchronize the session data 402. Once the session data 402 has been synchronized to each of the other CAC servers in the same server pool 106, the routine 500 returns to operation 504, described above.

Figure 6:
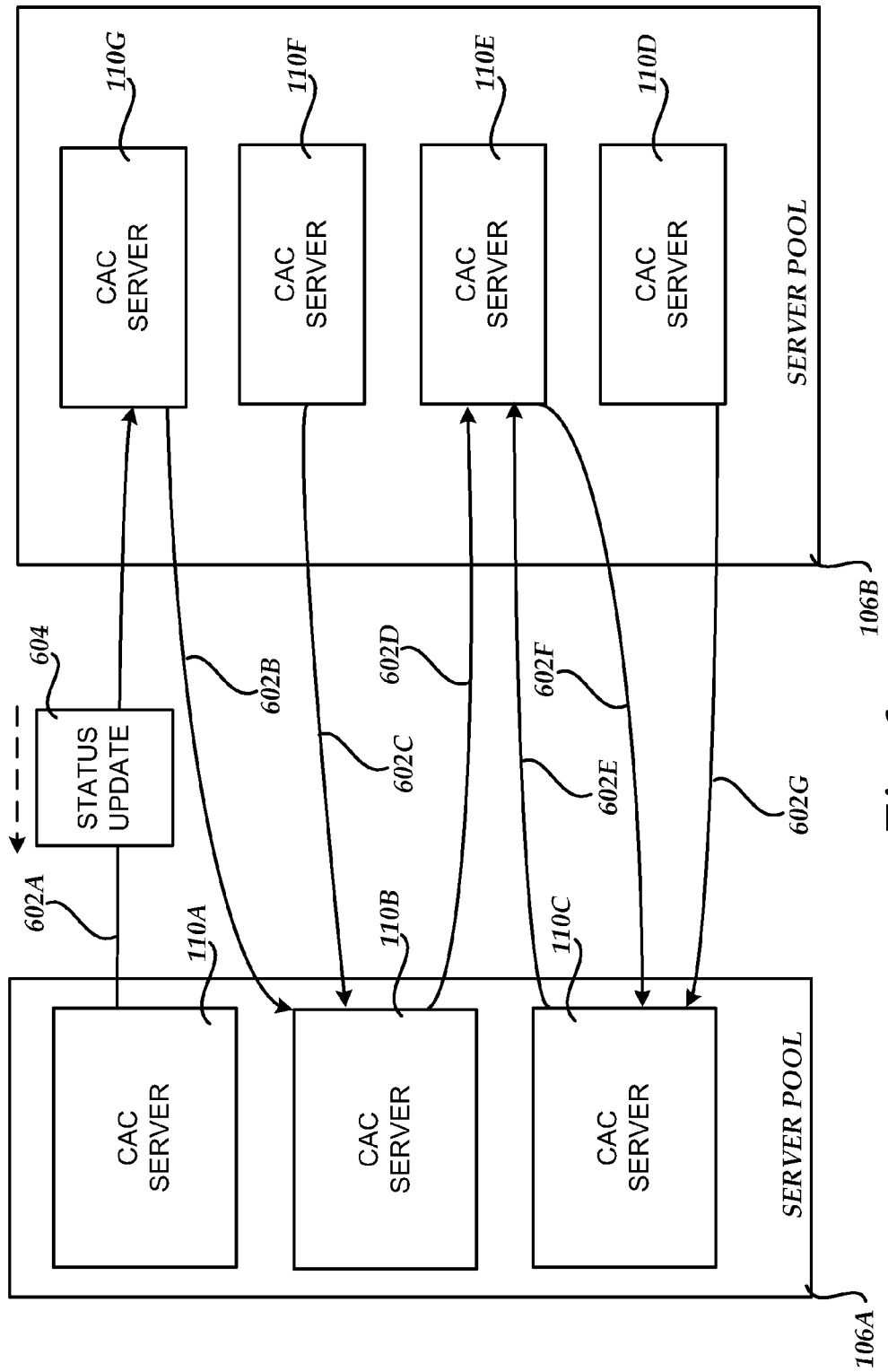
FIG. 6 is a network diagram showing illustrative network connections made between CAC servers in a first pool of CAC servers and CAC servers in a second pool of CAC servers according to one implementation.

Referring now to FIG. 6, a network diagram will be described that shows illustrative network connections 602 made between CAC servers 110A-110C in a first pool 106A and CAC servers 110D-110G in a second pool 106B. As discussed briefly above, in one embodiment the CAC servers in each pool 106 are further configured to perform inter-pool synchronization. In this manner, CAC servers 110 located in different pools 106 can synchronize data necessary for making bandwidth policy decisions to one another. This information might then be utilized by a CAC server 110 to respond to bandwidth requests for network links owned by another server pool 106. Additional details regarding this process will be provided below.

According to one embodiment, each of the CAC servers 110 are configured to establish exactly one network connection to a CAC server in another pool of CAC servers for use in inter-pool synchronization. For instance, each of the CAC servers 110A-110C might establish exactly one network connection 602 to a CAC server in the server pool 106B. The CAC servers 110D-110G in the pool 106B may also establish exactly one network connection 602 to CAC servers 110A-110C in the pool 106A.

In the example shown in FIG. 6, the CAC server 110A has established a network connection 602A to the CAC server 110G, the CAC server 110B has established a network connection 602D to the CAC server 110E, and the CAC server 110C has established a network connection 602E to the CAC server 110E. The CAC server 110G has established a connection 602B to the CAC server 110B, the CAC server 110F has established a network connection 602C to the CAC server 110B, the CAC server 110E has established a network connection 602F to the CAC server 110C, and the CAC server 110D has established the network connection 602G to the CAC server 110C.

According to various embodiments, the particular CAC server 110 to which a network connection 602 is established might be selected randomly. For instance, a load balancer might be placed in front of the CAC servers 110D-110G that randomly selects a CAC server 110D-110G to which a new connection is to be established. In another embodiment, a round robin approach might be utilized to select a particular CAC server 110 to which a new network connection is to be established. In this example, each of the CAC servers 110A-110D might maintain a list of CAC servers in other pools and utilize this list to select a CAC server for connection utilizing a round robin algorithm. It should be appreciated that other mechanisms might also be utilized to select the particular CAC server 110 to which a network connection will be established.

As also discussed briefly above, each of the CAC servers 110 are configured to periodically transmit a status update 604 to a CAC server 110 in another server pool. For instance, in the example shown in FIG. 6, the CAC server 110G is transmitting a status update 604 to the CAC server 110A.

According to one implementation, the CAC servers 110 synchronize data, such as the status update 604, on an incoming connection. For instance, in the example shown in FIG. 6, the connection 602A was established by the CAC server 110A to the CAC server 110G. Accordingly, from the perspective of the CAC server 110G, the connection 602A is an incoming connection. Each of the CAC servers 110 is configured to synchronize data on an incoming network connection in the manner shown in FIG. 6 in this manner.

As discussed briefly above, the status update 604 is data identifying the status of one or more network links. As will be described below with reference to FIG. 7, the status update 604 might include data identifying a network link, a media type, and a current utilization of the network link. Additional details regarding an illustrative data structure for implementing the status update 604 will be provided below with reference to FIG. 7.

Turning now to FIG. 7, an illustrative data structure will be described for implementing the status update 604. The illustrative data structure shown in FIG. 7 includes a first field 702A for identifying a particular network link. The data structure also includes a field 702B for identifying a particular media type, such as audio or voice, on the corresponding network link. The data structure also includes a field 702G that includes data indicating the currently utilization of the network link identified in the field 702A for the media type identified in the field 702B. In the example shown in FIG. 7, a link is described for which four out of six available Mbps have been utilized for audio and for which two out of an available three Mbps have been utilized for video. It should be appreciated that a status update 604 might include additional information than illustrated in FIG. 7 and be formatted in an entirely different fashion.

Figure 8:
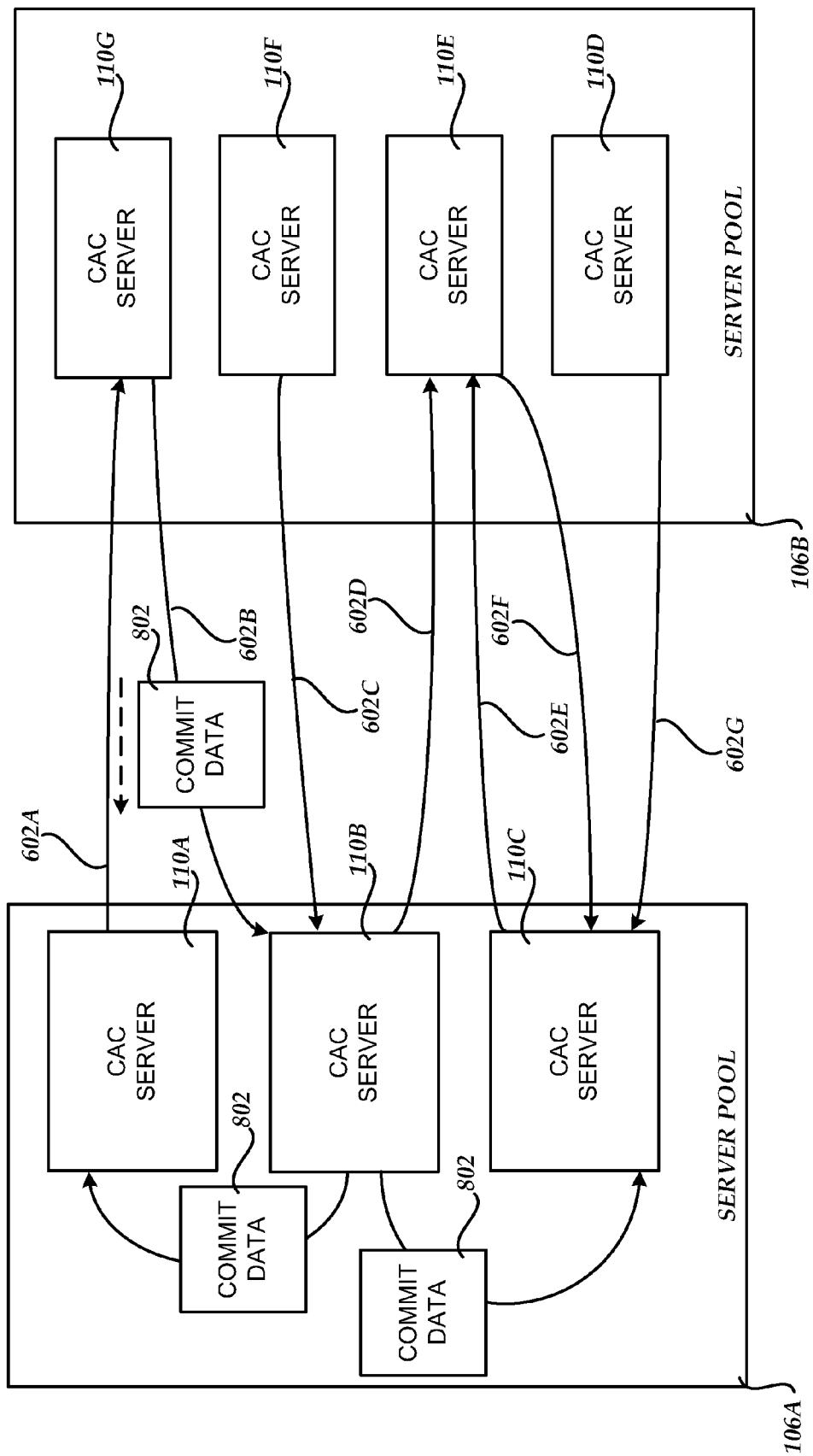
FIG. 8 is a network diagram showing aspects of one embodiment for synchronizing commit data between two pools of CAC servers in one embodiment disclosed herein.

Referring now to FIG. 8, a network diagram will be described showing aspects of one embodiment for synchronizing commit data between two pools of CAC servers according to one embodiment presented herein. As discussed briefly above, commit data is data indicating that a portion of the bandwidth of a particular network link has been committed for a session. A CAC server 110, such as the CAC server 110G in the pool 106B, may synchronize the commit data 802 to another pool 106A when the CAC server 110G handles a request for bandwidth for a network connection owned by another server pool 106A. Because, as discussed above, each of the pools 106A-106B is responsible for processing requests for a particular segment of the network, and because each of the pools 106A-106B is synchronized with the other pool, a bandwidth policy decision for a media session can be made by every CAC server 110A-110G. Previous solutions required propagating a decision request to the concerned owner pool during call setup. Implementations utilizing the technologies presented herein can reduce call setup time by a round trip between locations of the CAC server pools 106 as compared to previous solutions.

In the example shown in FIG. 8, the CAC server 110G has processed a bandwidth policy decision for a media session which resulted in bandwidth being committed for a network link managed by the server pool 106A. In order to ensure that each of the CAC servers 110A-G has access to consistent bandwidth information, the CAC server 110G synchronizes the commit data 802 to the CAC server 110B via the outgoing connection 602B. The CAC server 110B might also synchronize the commit data 802 to the CAC servers 110D-110F in the pool 106B.

When the CAC server 110B receives the commit data 802, the CAC server 110B may update its instance of the runtime database 112. The CAC server 110B also synchronizes the commit data 802 to the CAC servers 110A and 110C. The CAC servers 110A and 110C, in turn, update their instances of the runtime database 112. In this manner, the commit data 802 is synchronized between each of the CAC servers 110 in the pools 106A-106B.

Figure 9:
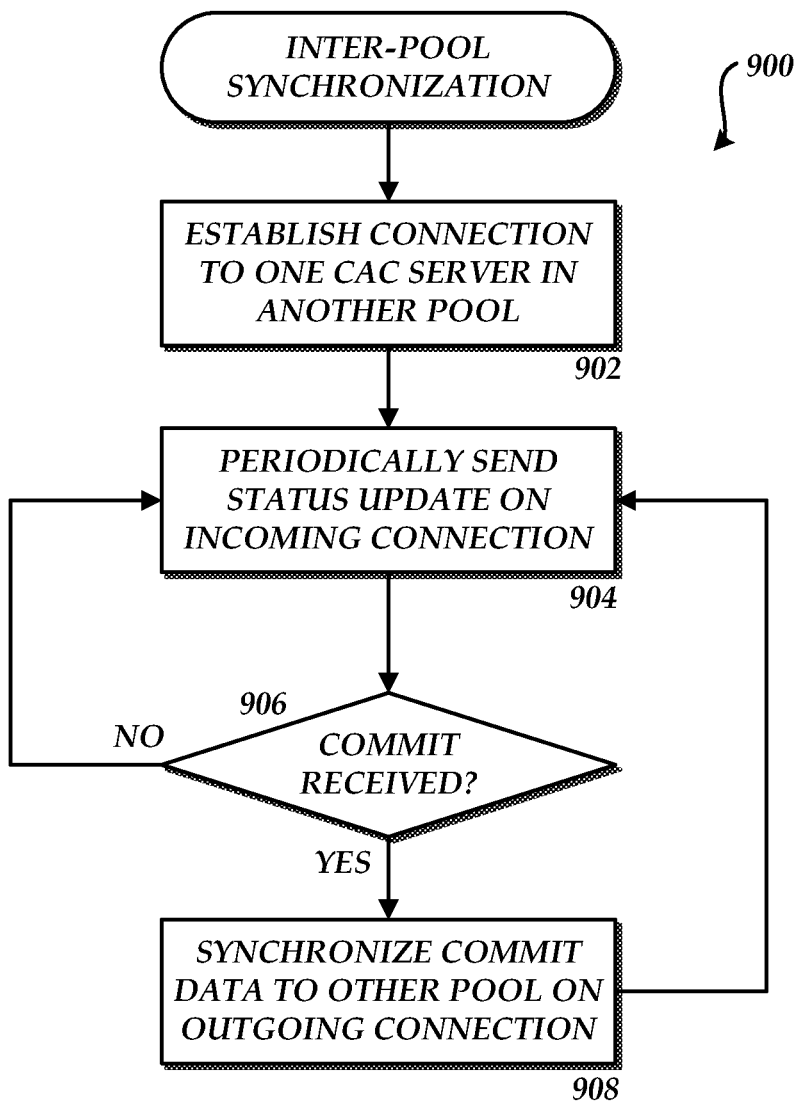
FIG. 9 is a flow diagram showing aspects of one process presented herein for synchronizing data between CAC servers in a first pool of CAC servers and CAC servers in a second pool of CAC servers according to one embodiment disclosed herein.

Referring now to FIG. 9, a flow diagram will be described showing an illustrative routine 900 for synchronizing data between CAC servers 110 in a first pool 106A of CAC servers 110A-110C and CAC servers 110D-110G in a second pool 106B of CAC servers according to one embodiment disclosed herein. The routine 900 begins at operation 902, where each of the CAC servers 110A-110G establishes a connection 602 to exactly one other CAC server 110A-110G in another pool. This process was described above with reference to FIG. 7. Once the connections 602A-602G have been established, the routine 900 proceeds from operation 902 to operation 904.

At operation 904, each of the CAC servers 110A-110G periodically transmits a status update 604 on an incoming network connection. For instance, as discussed above with reference to FIG. 6, the CAC server 110G may transmit a status update 604 on the incoming network connection 602A to the CAC server 110A. The receiving CAC server 110A then synchronizes the status update 604 to the other CAC servers 110B-110C in the same server pool 106A.

From operation 904, the routine 900 proceeds to operation 906 where each of the CAC servers 110A-110G make a determination as to whether a commit was performed on behalf of another server pool. If not, the routine 900 proceeds to operation 904, described above. If so, the routine 900 proceeds from operation 906 to operation 908 where the CAC server 110 performing the commit operation synchronizes the commit data 802 to the proper pool 106 on an outgoing network connection. For instance, as discussed above, with reference to FIG. 8, the CAC server 110G may receive a commit for bandwidth on a network link assigned to the server pool 106A. In response thereto, the CAC server 110G transmits the commit data 802 to the CAC server 110B on the outgoing network connection 602B. The CAC server 110B then synchronizes the commit data 802 to the CAC servers 110A and 110C. From operation 908, the routine 900 proceeds to operation 904, described above. It should be appreciated that commit data might only be synchronized to another pool when the commit involves network routes that belong to another pool.

It should be appreciated that, according to embodiments, each client 104 transmits a request during call setup to a CAC server 110 to determine if requested bandwidth is available (multiple paths could be checked for the bandwidth availability). If the bandwidth is available, the client 104 transmits data (called "a commit") indicating how much bandwidth was actually utilized. In an infrastructure with multiple pools 106 where network links are owned by different pools 106, the checks are typically answered by the CAC server 110 that receives the check.

Since, as described above, each CAC server 110 has the current usage details because of status updates and commits received from the other CAC servers 110, a check can be answered by any CAC server 110 without contacting the other CAC servers 110. Later, when the client 104 sends the commit, the commit is transmitted to the various CAC servers 110 as described above. Call setup time may therefore be minimized where a local CAC server 110 answers a bandwidth check. In the embodiment shown in FIG. 1, for instance, the client 104A might primarily use the network paths owned by the CAC servers in pool 106A and, similarly, the client 104B might utilize network paths owned by pool 106B. As a result, a brief delay in transmitting status updates (status updates may be transmitted periodically as discussed above) to another pool is acceptable.

Figure 10:
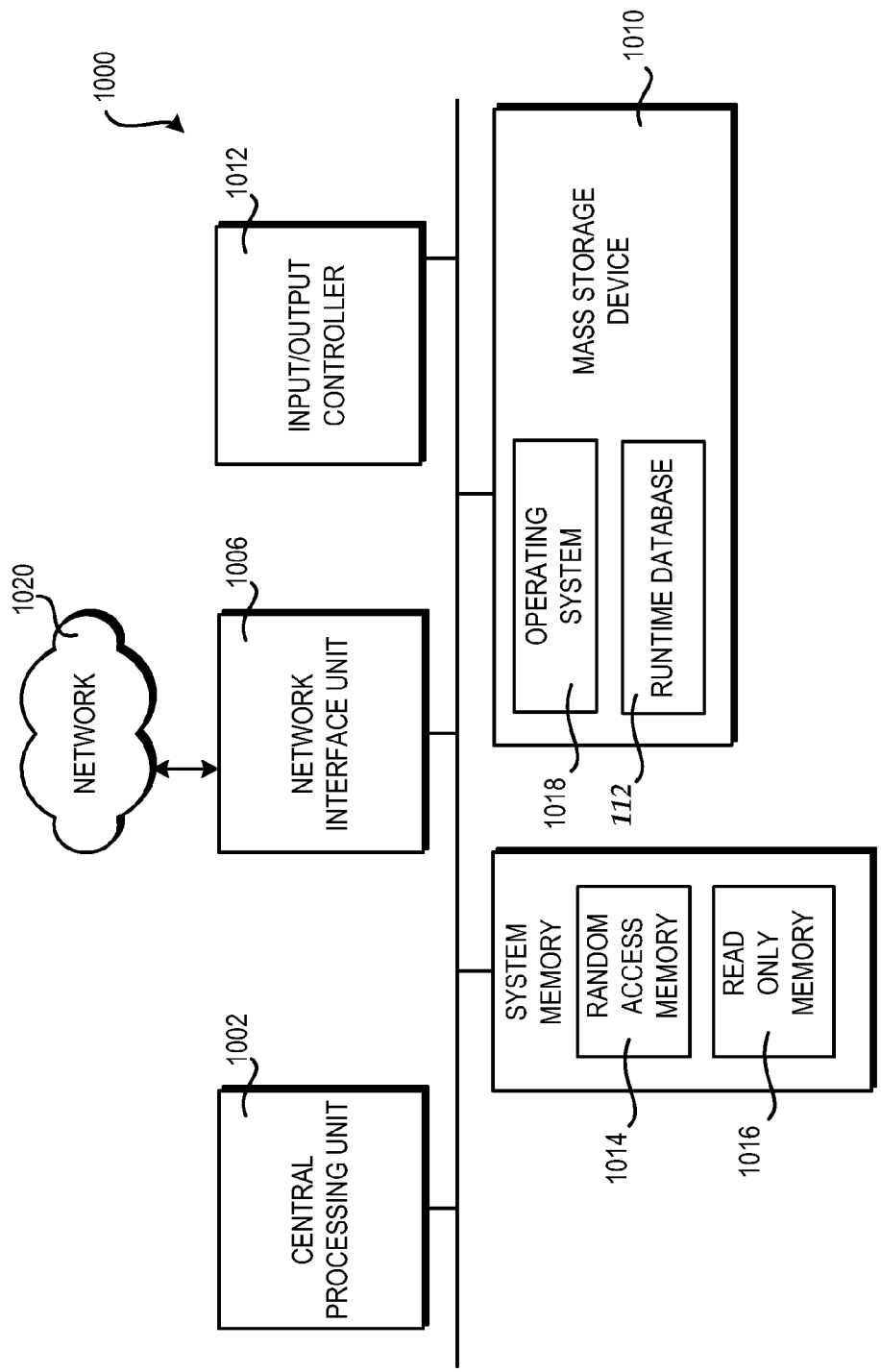
FIG. 10 is a computer architecture diagram showing an illustrative computer hardware and software architecture for a computing system capable of implementing the embodiments presented herein.

FIG. 10 shows an illustrative computer architecture for a computer 1000 capable of executing the software components described herein for efficient connection management and synchronization in the provision of CAC services. The computer architecture shown in FIG. 10 illustrates a conventional desktop, laptop computer, or server computer and may be utilized to execute the various software components described herein.

The computer architecture shown in FIG. 10 includes a central processing unit 1002 ("CPU"), a system memory 1008, including a random access memory 1014 ("RAM") and a read-only memory ("ROM") 1016, and a system bus 1004 that couples the memory to the CPU 1002. A basic input/output system ("BIOS") containing the basic routines that help to transfer information between elements within the computer 1000, such as during startup, is stored in the ROM 1016. The computer 1000 further includes a mass storage device 1010 for storing an operating system 1018, application programs, and other program modules, which will be described in greater detail below.

The mass storage device 1010 is connected to the CPU 1002 through a mass storage controller (not shown) connected to the bus 1004. The mass storage device 1010 and its associated computer-readable media provide non-volatile storage for the computer 1000. Although the description of computer-readable media contained herein refers to a mass storage device, such as a hard disk or CD-ROM drive, it should be appreciated by those skilled in the art that computer-readable storage media can be any available computer storage media that can be accessed by the computer 1000.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 1000.

According to various embodiments, the computer 1000 may operate in a networked environment using logical connections to remote computers through a network such as the network 1020. The computer 1000 may connect to the network 1020 through a network interface unit 1006 connected to the bus 1004. It should be appreciated that the network interface unit 1006 may also be utilized to connect to other types of networks and remote computer systems. The computer 1000 may also include an input/output controller 1012 for receiving and processing input from a number of other devices, including a keyboard, mouse, or electronic stylus (not shown in FIG. 10). Similarly, an input/output controller may provide output to a display screen, a printer, or other type of output device (also not shown in FIG. 10).

As mentioned briefly above, a number of program modules and data files may be stored in the mass storage device 1010 and RAM 1014 of the computer 1000, including an operating system 1018 suitable for controlling the operation of a networked desktop, laptop, or server computer. The mass storage device 1010 and RAM 1014 may also store one or more program modules. In particular, the mass storage device 1010 and the RAM 1014 may store program modules which, when executed, cause the CAC servers 110 to operate in the manner described above. The mass storage device 1010 and RAM 1014 may also store other program modules and data, such as the runtime database 112.

In general, software applications or modules may, when loaded into the CPU 1002 and executed, transform the CPU 1002 and the overall computer 1000 from a general-purpose computing system into a special-purpose computing system customized to perform the functionality presented herein. The CPU 1002 may be constructed from any number of transistors or other discrete circuit elements, which may individually or collectively assume any number of states. More specifically, the CPU 1002 may operate as one or more finite-state machines, in response to executable instructions contained within the software or modules. These computer-executable instructions may transform the CPU 1002 by specifying how the CPU 1002 transitions between states, thereby physically transforming the transistors or other discrete hardware elements constituting the CPU 1002.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for efficient connection management and synchronization in the provision of CAC services have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for connecting call admission control (CAC) servers and synchronizing data between the CAC servers, the method comprising performing computer-implemented operations for:
 establishing a first network connection between each of the CAC servers grouped together in a first pool of CAC servers according to a geographic location;
 establishing exactly one second network connection from a CAC server in the first pool of CAC servers to a CAC server in a second pool of CAC servers grouped together according to a geographic location;
 receiving session data at one of the CAC servers in the first pool of CAC servers;
 performing intra-synchronization between the first pool of CAC servers by synchronizing the received session data from the CAC server that received the session data to each of the other CAC servers in the first pool of CAC servers by way of the first network connection;
 performing inter-synchronization between the first pool of CAC servers and the second pool of CAC servers by receiving a status update at the one of the CAC servers in the first pool of CAC servers from the CAC server in the second pool of CAC servers by way of the second network connection, wherein the status update comprises data identifying a network link, a media type, and a current utilization of the network link; and
 synchronizing the status update received at the one of the CAC servers in the first pool of CAC servers to other CAC servers in the first pool of CAC servers.

2. The computer-implemented method of claim 1, further comprising synchronizing commit data from a CAC server in the second pool of CAC servers to a CAC server in the first pool of CAC servers by way of the second network connection.

3. The computer-implemented method of claim 2, further comprising:
 receiving the commit data at the CAC server in the first pool of CAC servers by way of the second network connection; and
 synchronizing the commit data to each of the other CAC servers in the first pool of CAC servers.

4. An optical disk, a solid-state storage device, or a magnetic storage device having computer-executable instructions stored thereupon which, when executed by a computer, cause the computer to:
 establish a first network connection between each of the call admission control (CAC) servers grouped together in a first pool of CAC servers according to a geographic location;
 establish a second network connection from a CAC server in the first pool of CAC servers to exactly one CAC server in a second pool of CAC servers grouped together according to a geographic location;
 receive session data at one of the CAC servers in the first pool of CAC servers;
 synchronize the received session data from the CAC server that received the session data to each of the other CAC servers in the first pool of CAC servers by way of the first network connection;
 receive a status update at the one of the CAC servers in the first pool of CAC servers from the CAC server in the second pool of CAC servers by way of the second network connection, wherein the status update comprises data identifying a network link, a media type, and a current utilization of the network link; and to
 synchronize the status update received at the one of the CAC servers in the first pool of CAC servers to other CAC servers in the first pool of CAC servers.

5. The optical disk, solid-state storage device, or magnetic storage device of claim 4, having further computer-executable instructions stored thereupon which, when executed by the computer, cause the computer to synchronize commit data from a CAC server in the second pool of CAC servers to a CAC server in the first pool of CAC servers by transmitting the commit data from the CAC server in the second pool of CAC servers to the CAC server in the first pool of CAC servers using the second network connection.

6. The optical disk, solid-state storage device, or magnetic storage device of claim 5, having further computer-executable instructions stored thereupon which, when executed by the computer, cause the computer to:
 receive the commit data at the CAC server in the first pool of CAC servers by way of the second network connection; and to
 synchronize the commit data to each of the other CAC servers in the first pool of CAC servers.

7. A system for connecting call admission control (CAC) servers and synchronizing data between the CAC servers, the system comprising:
 a plurality of computers configured to implement a pool of CAC servers grouped together in a first pool of CAC servers according to a geographic location, wherein each of the CAC servers in the first pool is connected to every other CAC server in the first pool by way of a first network connection and wherein a CAC server in the first pool is connected to exactly one CAC server in a second pool of CAC servers by way of a second network connection, and wherein the CAC servers in the first pool are configured to synchronize commit data and session data to the other servers in the first pool using the first network connection; and
 a plurality of computers configured to implement a pool of CAC servers grouped together in the second pool of CAC servers according to a geographic location, wherein each of the CAC servers in the second pool is connected to every other CAC server in the second pool by way of a third network connection and wherein a CAC server in the second pool is connected to exactly one CAC server in the first pool of CAC servers by way of the second network connection, and wherein the CAC servers in the first pool are configured to synchronize status data to CAC servers in the second pool by way of the second network connection, wherein the status data comprises data identifying a network link, a media type, and a current utilization of the network link, and wherein the CAC servers in the second pool are configured to synchronize the status data to CAC servers in the first pool by way of the second network connection, and wherein the CAC servers in the second pool are configured to synchronize the commit data and session data to the other servers in the second pool by way of the third network connection.

8. The system of claim 7, wherein the data further comprises commit data indicating that data has been committed to a network link, and wherein the network connection comprises an outgoing network connection.

9. The computer-implemented method of claim 1, wherein each of the CAC servers in the first pool of CAC servers and each of the CAC servers in the second pool of CAC servers provide functionality for managing bandwidth utilization.

10. The computer-implemented method of claim 1, wherein each of the CAC servers grouped together in the first pool of CAC servers is connected to each of the other CAC servers in the first pool of CAC servers.

11. The optical disk, solid-state storage device, or magnetic storage device of claim 4, wherein each of the CAC servers in the first pool of CAC servers and each of the CAC servers in the second pool of CAC servers provide functionality for managing bandwidth utilization.

12. The optical disk, solid-state storage device, or magnetic storage device of claim 4, wherein each of the CAC servers grouped together in the first pool of CAC servers is connected to each of the other CAC servers in the first pool of CAC servers.

* * * * *